(12) United States Patent
Bowman et al.

(10) Patent No.: US 8,092,921 B2
(45) Date of Patent: *Jan. 10, 2012

(54) CLEARCOAT COMPOSITION FOR USE IN WATERBORNE BASECOAT-CLEARCOAT COMPOSITE COATINGS

(75) Inventors: Mark P. Bowman, New Kensington, PA (US); Stephen J. Thomas, Aspinwall, PA (US)

(73) Assignee: PPG Industries Ohio, Inc, Cleveland, OH (US)

( * ) Notice: Subject to any disclaimer, the term of this patent is extended or adjusted under 35 U.S.C. 154(b) by 775 days.

This patent is subject to a terminal disclaimer.

(21) Appl. No.: 11/840,300

(22) Filed: Aug. 17, 2007

(65) Prior Publication Data

US 2009/0047443 A1    Feb. 19, 2009

(51) Int. Cl.
*B32B 27/32* (2006.01)
*B05D 7/26* (2006.01)
*B05D 3/06* (2006.01)

(52) U.S. Cl. ............. 428/521; 427/508; 427/407.1

(58) Field of Classification Search ........... 427/553, 427/384, 487, 508, 407.1; 525/189; 428/411.1, 428/500, 515, 516, 517, 519, 521, 523
See application file for complete search history.

(56) References Cited

U.S. PATENT DOCUMENTS

| | | | |
|---|---|---|---|
| 3,355,512 A | 11/1967 | De Acetis | |
| 3,661,744 A * | 5/1972 | Kehr et al. | 428/419 |
| 3,697,621 A * | 10/1972 | Kehr et al. | 525/440.07 |
| 3,697,622 A * | 10/1972 | Kehr et al. | 528/65 |
| 3,708,413 A * | 1/1973 | Kehr et al. | 522/97 |
| 3,832,421 A * | 8/1974 | Morgan | 428/419 |
| 3,856,645 A * | 12/1974 | Morgan | 430/287.1 |
| 3,872,150 A * | 3/1975 | Kehr et al. | 560/33 |
| 3,925,320 A * | 12/1975 | Morgan | 428/500 |
| 3,945,982 A * | 3/1976 | Morgan | 528/376 |
| 3,976,553 A | 8/1976 | Larsen | |
| 3,984,297 A * | 10/1976 | Morgan | 522/97 |
| 3,984,606 A * | 10/1976 | Morgan | 428/419 |
| 4,002,798 A * | 1/1977 | Morgan | 428/419 |
| 4,006,270 A * | 2/1977 | Morgan | 430/275.1 |
| 4,008,341 A * | 2/1977 | Kehr | 427/516 |
| 4,017,371 A * | 4/1977 | Morgan | 522/97 |
| 4,017,650 A * | 4/1977 | Morgan | 427/518 |
| 4,018,940 A * | 4/1977 | Morgan | 430/315 |
| 4,020,086 A * | 4/1977 | Morgan | 548/319.5 |
| 4,045,516 A * | 8/1977 | Morgan | 525/278 |
| 4,139,385 A | 2/1979 | Crivello | |
| 4,157,421 A * | 6/1979 | Schmidle et al. | 428/419 |
| 4,233,205 A * | 11/1980 | O'Connor et al. | 524/871 |
| 4,234,676 A | 11/1980 | Hein | |
| 4,808,638 A | 2/1989 | Steinkraus | |
| 5,095,069 A | 3/1992 | Ambrose | |
| 5,236,967 A * | 8/1993 | Ohkawa et al. | 522/32 |
| 5,360,873 A * | 11/1994 | Ohkawa et al. | 525/193 |
| 5,876,805 A | 3/1999 | Ostlie | |
| 6,172,179 B1 | 1/2001 | Zook et al. | |
| 6,639,046 B1 | 10/2003 | Van Dijk | |
| 2009/0047442 A1 | 2/2009 | Bowman | |
| 2009/0047531 A1 | 2/2009 | Bartley et al. | |
| 2009/0047546 A1 | 2/2009 | Bowman et al. | |
| 2009/0286002 A1 | 11/2009 | Iezzi et al. | |

FOREIGN PATENT DOCUMENTS

| | | | |
|---|---|---|---|
| JP | 57-080428 A | * | 5/1982 |
| WO | WO 00/71605 A1 | | 11/2000 |

OTHER PUBLICATIONS

Sanui et al., "The Catalytic Effect of Alcohol and Mercaptan on the Michael Reaction of Acrylates", Bulletin of the Chemical Society of Japan, vol. 40, 1727 (1967).

* cited by examiner

*Primary Examiner* — William Phillip Fletcher, III

(74) *Attorney, Agent, or Firm* — Diane R. Meyers

(57) ABSTRACT

A process for forming a color-clear multilayer coating on a substrate is disclosed. The basecoat is a waterborne coating and the clear topcoat is isocyanate containing and comprises a polyene and a polythiol. The isocyanate can be present as a separate component or can be an isocyanate-functional polyene.

32 Claims, No Drawings

CLEARCOAT COMPOSITION FOR USE IN WATERBORNE BASECOAT-CLEARCOAT COMPOSITE COATINGS

FIELD OF THE INVENTION

The present invention relates to clearcoat compositions that are useful in multilayer coatings such as colored basecoat-clear topcoat composite coatings in which the basecoat is derived from a waterborne coating composition. The multilayer coatings are useful in automotive refinish applications.

BACKGROUND OF THE INVENTION

Multilayer coatings for use over surfaces of automobiles and trucks are well known in the art. Initially such compositions were organic solvent based. However, as environmental regulations became more prevalent, waterborne systems and high solids organic solvent-based systems have increased in popularity. However, such coatings typically require heating to achieve the desired physical and chemical properties. This has presented particular problems in the automotive refinish market where curing ovens are not used, and coatings for automotive refinish applications must attain the necessary physical and chemical properties at ambient temperature. In copending application Ser. No. 11/840,292, filed even date herewith, there is disclosed a radiation curable clearcoat composition based on a polyene and a polythiol. Such compositions can be formulated as high solids compositions and can be used over organic solvent-based and waterborne basecoats. Unfortunately, performance over waterborne basecoats is often less than desired. It is believed the coating derived from the waterborne basecoat contains residual moisture that adversely affects the humidity resistance of the multilayer coating.

SUMMARY OF THE INVENTION

The present invention provides a process for forming a multilayer coating on a substrate comprising:
(a) depositing a color-imparting waterborne basecoat composition on the substrate to form a basecoat layer,
(b) depositing a clear isocyanate functional topcoat composition comprising:
  (i) a polyene, and
  (ii) a polythiol;
  the isocyanate functionality being derived from a separate component or an isocyanate functional polyene;
(c) exposing the clear topcoat layer to radiation to cure the clear topcoat layer.
Preferably, the clear topcoat composition comprises:
(a) an isocyanate functional polyene, and
(b) a polythiol.

DETAILED DESCRIPTION OF EMBODIMENTS OF THE INVENTION

For purposes of the following detailed description, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances.

The term "polymer" is also meant to include copolymer and oligomer.

Acrylic and methacrylic are designated as (meth)acrylic. Likewise, allyl and methallyl are designated as (meth)allyl.

Aliphatic and cycloaliphatic are designated as (cyclo)aliphatic.

The term "radiation" means free radical generating radiation.

The waterborne basecoat composition comprises a polymeric film-forming binder, color-imparting agents, diluent comprising water and optionally organic solvent, and additives that are conventionally used in waterborne basecoat compositions.

Examples of polymeric film-forming binders are resins or polymers that are water dispersible, such as water-dispersible polyurethane polymers and water-dispersible polymers produced by free radical addition polymerization of various (meth)acrylic and vinyl monomers including mixtures of such monomers, typically referred to as acrylic polymers.

By "water-dispersible" is meant the polymer forms two-phase transparent, translucent or opaque system in which the polymer is in the dispersed phase and water is in the continuous phase. The average particle size of the polymer phase is generally less than 1.0, usually less than 0.5 and typically less than 0.15 micron.

Examples of water-dispersed polyurethanes are disclosed in U.S. Pat. No. 6,384,131. Examples of waterborne basecoats based on water-dispersed acrylic polymers are disclosed in U.S. Pat. No. 5,204,401. U.S. Pat. No. 5,169,719 discloses waterborne basecoats based on water-dispersed polyurethane/acrylic copolymers. U.S. Pat. No. 5,157,609 discloses waterborne basecoat compositions comprising nonionic dispersions of polymers selected from acrylic polymers, polyurethane polymers and mixtures thereof. Many of the polymeric film-forming binders used in the waterborne basecoats are commercially available materials available under the trademark NEOREZ, for example, NEOREZ R-966 available from Zeneca Resins. Acrylic polymer dispersions suitable for use in waterborne basecoats are available under the trademark RHOPLEX, such as RHOPLEX WL-91 from the Rohm and Haas Company. Typically, the polymeric film-forming binder is present in the waterborne basecoat composition in amounts of about 10 to 80 percent by weight based on weight of the coating composition.

Examples of color-imparting agents are pigments and dyestuffs known and customary in the paint industry.

Specific examples of the dyestuffs or pigments, which can be of inorganic or organic type, are titanium dioxide, graphite, carbon black, zinc chromate, strontium chromate, barium chromate, lead chromate, lead cyanamide, lead silicochromate, zinc oxide, cadmium sulfide, chromium oxide, zinc sulfide, nickel titanium yellow, chrome titanium yellow, iron oxide red, iron oxide black, ultramarine blue, phthalocyanine complexes, naphthol red, quinacridones, halogenated thioindigo pigments and the like. Also, metallic pigments such as aluminum flake may be used. Typically, the color-imparting agent is present in the waterborne basecoat composition in amounts of 2 to 60 percent by weight based on weight of the coating composition.

The coating agents according to the invention can also contain further customary additives, such as fillers, plasticizers, stabilizers, wetting agents, dispersing auxiliaries, flow-control agents, and defoamers, singly or mixed, in the customary amounts. These substances are typically present in amounts of 0 to 20 percent by weight based on weight of the coating composition.

In addition to water, the coating agents according to the invention can contain customary organic solvents, for example aliphatic or aromatic hydrocarbons, monohydric or polyhydric alcohols, ethers, esters, glycol ethers and esters thereof, and ketones, such as, for example, toluene, xylene, butanol, ethylglycol, butylglycol (ethylene glycol monoethyl or monobutyl ether) and acetates thereof, butyldiglycol (ethylene glycol dibutyl ether), ethylene glycol dimethyl ether, diethylene glycol dimethyl ether, cyclohexanone, methyl ethyl ketone, acetone, isophorone or mixtures thereof. Typically water is present in the coating composition in amounts of 20 to 90 percent by weight and organic solvents are present in amounts up to 50 percent by weight based on weight of the coating composition.

Waterborne basecoat compositions are commercially available from PPG Industries under the trademark ENVIROBASE, from E.I. duPont de Nemours under the trademark PERMACRON, and from BASF Coatings under the trademark GLASURIT.

The basecoats are applied to substrates by conventional processes such as spraying and to substrates that may be precoated with customary primer, primer surfacer and intermediate coats, such as those that are used for multilayer coating in the motor vehicle sector. The preferred substrates are metal or plastic parts.

Drying or hardening of the basecoat can be effected at room temperature or at elevated temperature. Drying may preferably be effected from 5 to 60 minutes, at 40-80° C. Drying of the basecoat is most preferably effected by means of infrared radiation. The thickness (dry film thickness) of the basecoat is typically 5 to 160 microns.

After the waterborne basecoat layer has been hardened, the clear isocyanate functional topcoat composition is applied to the basecoat layer. The clear topcoat composition comprises a polyene and a polythiol.

Suitable polyenes for use in the present invention are numerous and can vary widely. Such polyenes can include those that are known in the art. Non-limiting examples of suitable polyenes can include those that are represented by the formula:

$$A\text{-}(X)_m$$

wherein A is an organic moiety, m is an integer of at least 2, and X is an olefinically unsaturated moiety and m is at least 2, typically 2 to 4. Examples of X are groups of the following structure:

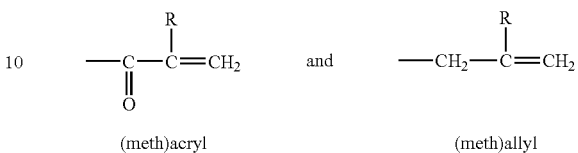

wherein each R is a radical selected from H and methyl.

The polyenes may be compounds or polymers having in the molecule olefinic double bonds that are polymerizable by exposure to radiation. Examples of such materials are (meth) acrylic-functional (meth)acrylic copolymers, epoxy resin (meth)acrylates, polyester (meth)acrylates, polyether (meth) acrylates, polyurethane (meth)acrylates, amino (meth)acrylates, silicone (meth)acrylates, and melamine (meth)acrylates. The number average molar mass (Mn) of these compounds is preferably around 200 to 10,000. The molecule preferably contains on average 2 to 20 olefinic double bonds that are polymerizable by exposure to radiation. Aliphatic and/or cycloaliphatic (meth)acrylates in each case are preferably used. (Cyclo)aliphatic polyurethane (meth)acrylates and (cyclo)aliphatic polyester (meth)acrylates are particularly preferred. The binders may be used singly or in mixture.

Specific examples of polyurethane (meth)acrylates are reaction products of the polyisocyanates such as 1,6-hexamethylene diisocyanate and/or isophorone diisocyanate including isocyanurate and biuret derivatives thereof with hydroxyalkyl (meth)acrylates such as hydroxyethyl (meth)acrylate and/or hydroxypropyl (meth)acrylate. Examples of polyester (meth)acrylates are the reaction products of (meth)acrylic acid or anhydride with polyols, such as diols, triols and tetraols, including alkylated polyols, such as propoxylated diols and triols. Examples of polyols include 1,4-butane diol, 1,6-hexane diol, neopentyl glycol, trimethylol propane, pentaerythritol and propoxylated 1,6-hexane diol. Specific examples of polyester (meth)acrylate are glycerol tri(meth) acrylate, trimethylolpropane tri(meth)acrylate, pentaerythritol tri(meth)acrylate and pentaerythritol tetra(meth)acrylate. Preferably, mixtures of polyurethane (meth)acrylates and polyester (meth)acrylates may be used.

Besides (meth)acrylates, (meth)allyl compounds or polymers can be used either alone or in combination with (meth) acrylates. Examples of (meth)allyl materials are polyallyl ethers such as the diallyl ether of 1,4-butane diol and the triallyl ether of trimethylol propane. Examples of other (meth)allyl materials are polyurethanes containing (meth) allyl groups. For example, reaction products of the polyisocyanates such as 1,6-hexamethylene diisocyanate and/or isophorone diisocyanate including isocyanurate and biuret derivatives thereof with hydroxyl-functional allyl ethers, such as the monoallyl ether of 1,4-butane diol and the diallylether of trimethylol propane.

Isocyanate functionality can be incorporated into the clear topcoat composition in a number of ways. Preferably, the polyurethane (meth)acrylate or the polyurethane (meth)allyl compound is prepared in a manner such that the reaction product contains unreacted isocyanate groups. For example, the above-mentioned reaction product of 1,6-hexamethylene diisocyanate and/or isophorone diisocyanate with hydroxyethyl (meth)acrylate and/or hydroxypropyl (meth)acrylate are reacted in an NCO/OH equivalent ratio of greater than 1. Alternately, such reaction products can be prepared such that they are isocyanate free, i.e., NCO/OH equivalent ratio equal to or less than 1, and a separate isocyanate compound such as the aforementioned polyisocyanates can be included in the topcoat composition.

Although not intending to be bound by any theory, it is believed the presence of residual water in the hardened basecoat layer adversely affects the adhesion of the subsequently applied clear topcoat to the basecoat layer. This leads to relatively poor performance properties, particularly humidity resistance, of the clear topcoat. It is believed isocyanate reacts with the residual water resulting in better intercoat adhesion and better performance properties.

The amount of the isocyanate functionality in the clear topcoat composition need not be that great and is typically at least 1, usually from 1 to 5 percent by weight measured as NCO and based on weight of the topcoat composition.

Besides the polyene, the clear topcoat composition contains a polythiol, polythiol functional material. As used herein the term "polythiol", "polythiol functional material" refers to polyfunctional materials containing two or more thiol functional groups (SH). Suitable polythiol functional materials for use in forming the radiation curable topcoat composition are numerous and can vary widely. Such polythiols can include those that are known in the art. Non-limiting examples of suitable polythiols can include, but are not limited to, polythiols having at least two thiol groups including compounds and polymers. The polythiol can have ether linkages (—O—), sulfide linkages (—S—), including polysulfide linkages (—S$_x$—), wherein x is at least 2, such as from 2 to 4, and combinations of such linkages.

The polythiols for use in the present invention include, but are not limited to, materials of the formula:

wherein $R_1$ is a polyvalent organic moiety and n is an integer of at least 2, typically 2 to 6.

Non-limiting examples of suitable polythiols include, but are not limited to, esters of thiol-containing acids of the formula HS—$R_2$—COOH wherein $R_2$ is an organic moiety with polyhydroxy compounds of the structure $R_3$—(OH)$_n$ wherein $R_3$ is an organic moiety and n is at least 2, typically 2 to 6. These components can be reacted under suitable conditions to give polythiols having the general structure:

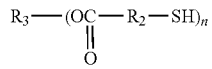

wherein $R_2$, $R_3$ and n are as defined above.

Examples of thiol-containing acids are thioglycolic acid (HS—CH$_2$COOH), α-mercaptopropionic acid (HS—CH(CH$_3$)—COOH) and β-mercaptopropionic acid (HS—CH$_2$CH$_2$COCH) with polyhydroxy compounds such as glycols, triols, tetraols, pentaols, hexaols, and mixtures thereof. Other non-limiting examples of suitable polythiols include, but are not limited to, ethylene glycol bis(thioglycolate), ethylene glycol bis(β-mercaptopropionate), trimethylolpropane tris(thioglycolate), trimethylolpropane tris(β-mercaptopropionate), pentaerythritol tetrakis(thioglycolate) and pentaerythritol tetrakis(β-mercaptopropionate), and mixtures thereof.

Typically, the polyene is present in the clear topcoat composition in amounts of 80 to 98, more typically 90 to 95 percent by weight, and the polythiol material is typically present in amounts of 2 to 20, more usually 5 to 10 percent by weight. The percentages by weight are based on total weight of polyene and polythiol.

The topcoat composition may contain a photoinitiator when exposed to ultraviolet radiation. Suitable photoinitiators are, for example, those that absorb within the wavelength range of 190 to 600 nm.

Examples of photoinitiators for radiation systems are benzoin and benzoin derivatives, acetophenone, and acetophenone derivatives such as, for example, 2,2-diacetoxyacetophenone, benzophenone and benzophenone derivatives, thioxanthone and thioxanthone derivatives, anthraquinone, 1-benzoylcyclohexanol, organophosphorus compounds such as, for example, acyl phosphine oxides. The photoinitiators when present are used in quantities of, for example, from 0.1 to 7 wt. %, preferably 0.5 to 5 wt. %, with reference to the weight of polyene and polythiol and photoinitiators. The photoinitiators may be used singly or in combination.

The topcoats optionally contain customary additives that are present in transparent coatings. These include rheology control agents, anti-foaming agents and wetting agents. For clear topcoat application, hindered amine light stabilizers may be present in the composition. These optional ingredients are present in amounts up to 10, and preferably no more than 5 percent by weight based on weight of the topcoating composition.

The transparent clear topcoat composition used in the content according to the invention may contain diluents such as organic solvents and/or water. However, preferably the compositions are 100 percent solids. Examples of suitable organic solvents are mono- or polyhydric alcohols, e.g., ethylene glycol and butanol, and glycol ethers or esters, e.g., diethylene glycol dialkyl ethers containing a $C_1$ to $C_6$ alkyl. When present, the diluents constitute up to 50 percent by weight of the topcoat composition based on weight of the composition.

The clear topcoats may also contain transparent pigments, such as colloidal silica, and colorants that are soluble in the coating composition such as dyes. These ingredients, if present, are present in the composition in amounts of up to 20, typically up to 10 percent by weight based on weight of the topcoat composition.

The topcoat compositions are applied over a colored basecoat by conventional coating techniques such as spraying.

After the clear topcoat is applied to the basecoat, the clear topcoat layer is cured by exposure to radiation. The radiation can be high-energy radiation or actinic radiation.

A class of high-energy bombardment includes energetic electrons such as those derived from isotopes such as strontium-90, or intense electron beams produced by particle accelerators. Electron beam curing is most useful in applications where very rapid and economical rates are desired. By way of example, in some systems curing periods of less than about one second may be experienced using a total radiation dose of less than about 0.25 megarads.

A class of actinic radiation useful herein is ultraviolet light and other forms of actinic radiation which are normally found in radiation emitted from the sun or from artificial sources such as Type RS Sunlamps, carbon arc lamps, xenon arc lamps, mercury vapor lamps, tungsten halide lamps and the like. Ultraviolet radiation may be used most efficiently if the photocurable polyene/polythiol composition contains a suitable photocuring rate accelerator. Curing periods may be adjusted to be very short and hence commercially economical by proper choice of ultraviolet source, photocuring rate accelerator and concentration thereof, temperature and molecular weight, and reactive group functionality of the polyene and polythiol. Curing periods of from 1 second to 15 minutes are typical.

Preferably, for safety reasons, low energy ultraviolet radiation falling within the 200-400 nanometer wavelength interval is preferred. Preferably, the ratio of UV-B content to UV-A content is 1:1 or less.

The thickness (dry film thickness) of the cured clear topcoat is typically from 25 to 160 microns.

EXAMPLES

The following examples are intended to illustrate the invention, and should not be construed as limiting the invention in any way. All parts and percentages are by weight unless otherwise indicated.

The following examples show the preparation of a multilayer coating comprising a waterborne basecoat and a clear topcoat. The clear topcoat comprised a polyene and a polythiol. In one example, the topcoat composition was isocyanate-functional (derived from an isocyanate-functional polyene). In the second example, the topcoat composition was free of isocyanate. Multilayer coatings were cured and tested for humidity resistance.

Waterborne Basecoat

ENVIROBASE T-3964, Sapphire Blue From PPG Industries

Polyenes

Example A

Preparation of Urethane Acrylate 06-112-094 (NCO Resin)

A urethane acrylate was prepared by heating a mixture of isophorone diisocyanate, DESMODUR Z 4470 SN (299.4 grams), Ionol (0.38 grams), dibutyltin dilaurate (1.32 grams) and triphenyl phosphite (0.60 grams) under nitrogen to a temperature of 70° C. Then, 2-hydroxyethyl acrylate (51.1 grams) was added all at once and held at 68-81° C. for 80 minutes. IR shows the presence of isocyanate functionality that was estimated to be 4 percent NCO based on urethane acrylate weight.

Example B

Preparation of Urethane Acrylate 06-112-092 (No NCO in Resin)

A urethane acrylate was prepared by heating a mixture of DESMODUR Z 4470 BA (2302.9 grams), Ionol (1.14 grams), dibutyltin dilaurate (7.92 grams) and triphenyl phosphite (14.44 grams) under nitrogen to a temperature of 70° C. Then, 2-hydroxyethyl acrylate (635.3 grams) was added over 30 minutes and held at 79-83° C. for 90 minutes. Then, 1,4-butanediol (60.42 grams) was added drop wise over 10 minutes. The reaction mixture was kept at 79-81° C. for 90 minutes. IR shows no NCO functionality remains.

Example C

Preparation of Urethane Acrylate 06-112-095 (No NCO in Resin)

A urethane acrylate was prepared by heating a mixture of DESMODUR Z 4470 SN (660.5 grams), Ionol (0.616 grams), dibutyltin dilaurate (1.75 grams), triphenyl phosphite (2.39 grams) and butyl acetate (131.9 grams) under nitrogen to a temperature of 70° C. Then, 2-hydroxyethyl acrylate (108.2 grams) was added over 30 minutes and held at 67-72° C. for 60 minutes. Then, 1,6-hexanediol (71.4 grams) was added all at once. The reaction mixture was kept at 82-89° C. for 30 minutes. IR shows no NCO functionality remains.

Polythiol

Example D

Preparation of 9-T Dendrimeric Thiol

A mixture of pentaerythritol tetrakis(3-mercaptopropionate) (2217.7 grams) and butyl amine (3.24 grams) was stirred under a nitrogen atmosphere while a solution of trimethylolpropane polyoxypropylene triacrylate esters (Sartomer SR492, 600.1 grams) in t-butyl acetate (745.5 grams) was added drop wise over 4 hours. The reaction temperature ranged from 22-32° C. The reaction mixture was then filtered to remove small amounts of gelatinous materials. The clear, colorless liquid was shown by proton NMR not to have any unreacted acrylate functionality.

Clearcoat Formulation

Example 1

A clearcoat formulation was prepared from the following mixture of ingredients:

| Formulation 07-DRB-045A | |
|---|---|
| Urethane acrylate of Example A | 65.88 grams |
| Urethane acrylate of Example B | 6.43 grams |
| Di-trimethylolpropane tetraacrylate | 27.22 grams |
| Tinuvin 384-2[1] | 2.32 grams |
| Sanol LS-292[2] | 1.10 grams |
| BYK 300[3] | 0.50 grams |
| N-PAL (tris(N-nitroso-N-phenylhydroxylamine) aluminum)[4] | 0.05 grams |
| Esacure One[5] | 5.00 grams |
| Irgacure 184[6] | 1.00 grams |
| N-Pentyl propionate | 20.0 grams |
| Methyl isobutyl ketone | 20.0 grams |
| Butyl acetate | 10.4 grams |
| Polythiol of Example D | 13.10 grams |

[1]UV absorber from Ciba Specialty Chemicals.
[2]Hindered amine light stabilizer from Sankyo Co.
[3]Silicon resin solution from BYK Chemie.
[4]Polymerization inhibitor from Albermare Corp.
[5]Photoinitiator from Lamberti Spa.
[6]Photoinitiator from Ciba Specialty Chemicals.

All of the above-mentioned ingredients, with the exception of the polythiol, were premixed together and the polythiol was added to the formulation immediately before spraying.

Example 2

Comparative

A clearcoat formulation similar to Example 1 was prepared but not using the urethane acrylate of Example A.

| Formulation 07-DRB-032 | |
| --- | --- |
| Urethane acrylate of Example C | 87.82 grams |
| Di-trimethylolpropane tetraacrylate | 24.3 grams |
| Tinuvin 400 | 2.56 grams |
| Sanol LS-292 | 1.10 grams |
| BYK 300 | 0.50 grams |
| N-PAL (tris(N-nitroso-N-phenylhydroxylamine) aluminum) | 0.05 grams |
| Esacure One | 5.00 grams |
| Irgacure 184 | 1.00 grams |
| N-Pentyl propionate | 33.73 grams |
| Acetone | 10 grams |
| Polythiol of Example D | 10.62 grams |

Instead, the urethane acrylate of Example A was replaced with the urethane acrylate of Example C.

Color-Clear Multilayer Coatings

One hundred (100) parts by volume of the waterborne basecoat was thinned with 10 to 30 parts by volume of ENVIROBASE T 494 thinner available from PPG Industries. The resulting paint was sprayed onto primed, cold rolled steel panels in two (2) to three (3) medium coats for a total drive film thickness of 0.40 to 0.80 mils (10.2 to 20.3 microns). A 3 to 5-minute flash was allowed between coats. The basecoat was then given a 15-minute flash before application of the clearcoats. The clearcoat formulations of Examples 1 and 2 were spray applied to the waterborne basecoats in two (2) single coats to give between 1 to 3 mils (25 to 75 microns) dry film thickness with a 5-minute flash after each coat.

The coated panels were then subjected to UV radiation for five (5) minutes under a 400 W Autoshot Lamp, clear filter, 25 centimeters from the coating surface. The coated panels were then tested for humidity resistance and the results are reported below.

| Clearcoat Example | Humidity Resistance[1] |
| --- | --- |
| 1 | 9.7 |
| 2 | 0 (total delamination) |

[1]Ten days of exposure at 40° C. (104° F.), and relative humidity of 95% to 100%. Assessment of degree of blistering determined by ASTM D714. The values range from 10 (best) to 0 (complete failure).

We claim:

1. A coating composition system, comprising:
a first layer comprising a color-imparting basecoat derived from a waterborne coating composition, and
a second layer applied thereon, wherein the second layer is derived from a clear coating composition comprising:
(a) a polyene;
(b) a polythiol; and
(c) a source of isocyanate functionality;
wherein the isocyanate functionality is derived from a separate compound or is derived from the polyene.

2. The system of claim 1 in which the waterborne coating composition is based on a water-dispersed polyurethane, water-dispersed (meth)acrylic polymer, and (meth)acrylic latex polymers including mixtures thereof.

3. The system of claim 1 in which the isocyanate functionality is derived from the polyene.

4. The system of claim 1 wherein (a) has the structural formula $A\text{-}(X)_m$ where A is derived from a polyisocyanate; X is an olefinically unsaturated moiety and m is at least 2.

5. The system of claim 4 in which A is derived from a (cyclo)aliphatic polyisocyanate.

6. The system of claim 4 in which the polyisocyanate is selected from 1,6-hexamethylene diisocyanate, isophorone diisocyanate including isocyanurate and biuret derivatives thereof.

7. The system of claim 4 in which X is selected from $-C(O)CR=CH_2$ and $-CH_2-CR=CH_2$ where R is hydrogen or methyl.

8. The system of claim 4 in which m is 2 to 6.

9. The system of claim 4 in which $A\text{-}(X)_m$ is an isocyanate-functional urethane (meth)acrylate.

10. The system of claim 1 in which (b) is a compound of the structure $R-(SH)_n$ where R is an organic moiety and n is at least 2.

11. The system of claim 10 in which R contains ester groups.

12. The system of claim 10 in which (b) is the reaction product of a thiol-functional organic acid and a polyol.

13. The system of claim 10 in which n is from 2 to 4.

14. The system of claim 1 in which (a) is present in the clear coating composition in amounts of 80 to 98 percent by weight and (b) is present in amounts of 2 to 20 percent by weight; the percentages by weight being based on weight of (a) and (b).

15. The system of claim 1 in which (a) is present in the clear coating composition in amounts of 90 to 95 percent by weight and (b) is present in amounts of 5 to 10 percent by weight; the percentages by weight being based on weight of (a) and (b).

16. The system of claim 1 in which the clear coating composition is exposed to ultraviolet radiation falling within the 200-400 nanometer wavelength interval.

17. A process for forming the coating composition system of claim 1 on a substrate comprising:
(a) depositing a color-imparting basecoat derived from a waterborne coating composition on the substrate to form a basecoat layer;
(b) depositing a clear coating composition on the basecoat layer to form a clear layer; the clear composition comprising:
(a) a polyene, and
(b) a polythiol; and
(c) a source of isocyanate functionality,
wherein the isocyanate functionality is derived from a separate component or is derived from the polyene;
(c) exposing the clear topcoat layer to radiation to cure the topcoat layer.

18. The process of claim 17 in which the waterborne coating composition is based on a water-dispersed polyurethane, water-dispersed (meth)acrylic polymer, and (meth)acrylic latex polymers including mixtures thereof.

19. The process of claim 17 in which the isocyanate functionality is derived from the polyene.

20. The process of claim 17 wherein (a) has the structural formula $A\text{-}(X)_m$ where A is derived from a polyisocyanate; X is an olefinically unsaturated moiety and m is at least 2.

21. The process of claim 20 in which A is derived from a (cyclo)aliphatic polyisocyanate.

22. The process of claim 20 in which the polyisocyanate is selected from 1,6-hexamethylene diisocyanate, isophorone diisocyanate including isocyanurate and biuret derivatives thereof.

23. The process of claim 20 in which X is selected from $-C(O)CR=CH_2$ and $-CH_2-CR=CH_2$ where R is hydrogen or methyl.

24. The process of claim 20 in which m is 2 to 6.

25. The process of claim 20 is which $A\text{-}(X)_m$ is an isocyanate-functional urethane (meth)acrylate.

26. The process of claim 17 in which (b) is a compound of the structure R—(SH)$_n$ where R is an organic moiety and n is at least 2.

27. The process of claim 26 in which R contains ester groups.

28. The process of claim 26 in which (b) is the reaction product of a thiol-functional organic acid and a polyol.

29. The process of claim 26 in which n is from 2 to 4.

30. The process of claim 17 in which the polyene is present in the clearcoat composition in amounts of 80 to 98 percent by weight and the polythiol is present in amounts of 2 to 20 percent by weight; the percentages by weight being based on weight of polyene and polythiol.

31. The process of claim 17 in which the polyene is present in the clearcoat composition in amounts of 90 to 95 percent by weight and the polythiol is present in amounts of 5 to 10 percent by weight; the percentages by weight being based on weight of polyene and polythiol.

32. The process of claim 17 in which the clearcoat is exposed to ultraviolet radiation falling within the 200-400 nanometer wavelength interval.

* * * * *